March 22, 1938.  J. O. LEWIS  2,111,597
VALVE
Filed May 5, 1934
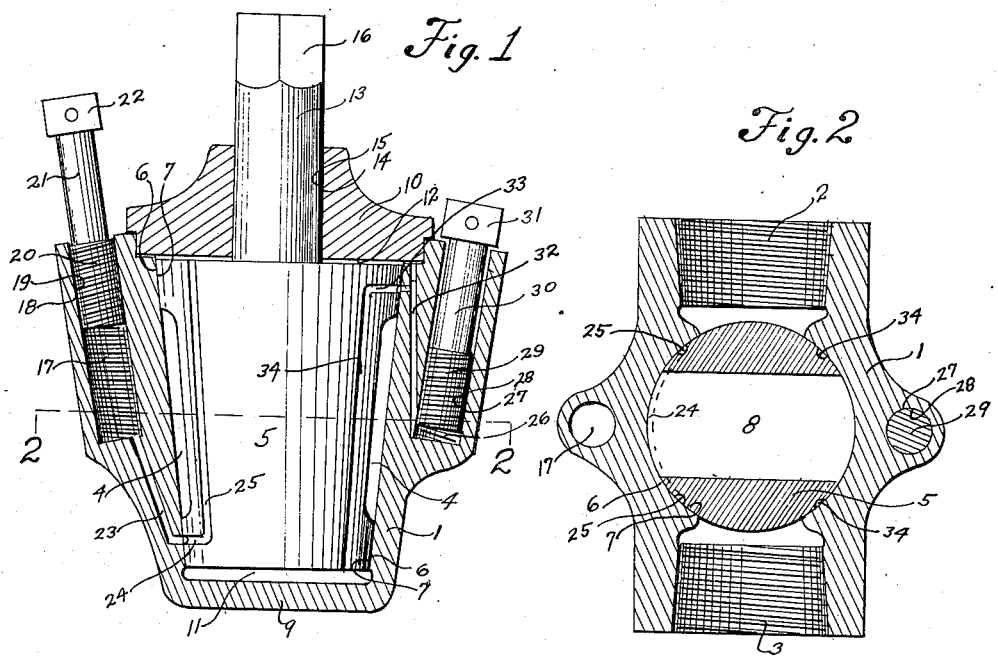
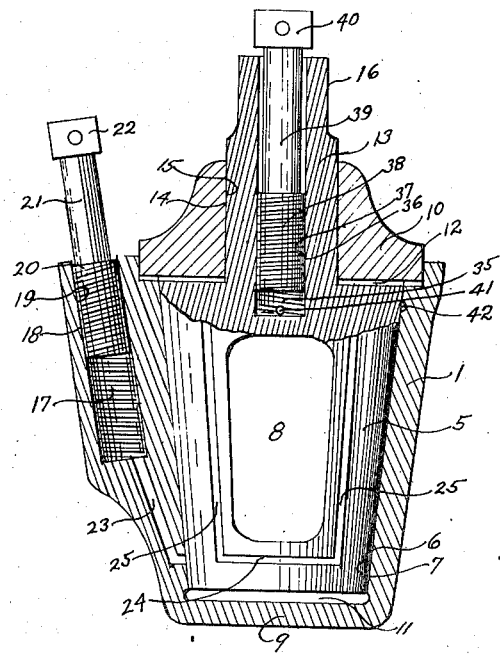
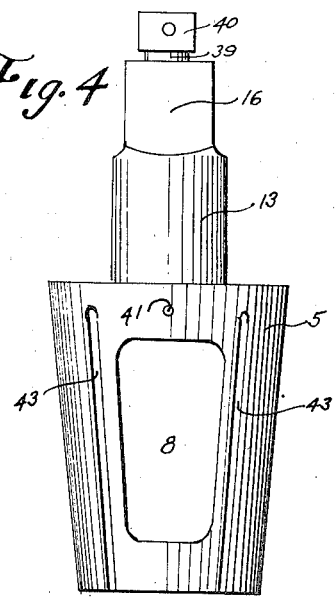
INVENTOR
James O. Lewis
BY
ATTORNEY Patented Mar. 22, 1938

2,111,597

UNITED STATES PATENT OFFICE 2,111,597

VALVE

James O. Lewis, Tulsa, Okla.

Application May 5, 1934, Serial No. 724,125

16 Claims. (Cl. 251—93)

My invention relates to pressure lubricated valves of the type wherein fluid pressure can be applied selectively to the top or bottom of a tapered plug to seat or unseat it as disclosed in my co-pending application Serial No. 722,273, filed April 25, 1934. The present improvement consists of separate pressure means to lift and seat the plug which can be operated either independently or cooperatively.

Further objects of the improvement are to provide a cheap and simple construction easily understood by the operator; to provide a valve requiring less head room; and to avoid molding the grease around the stem as required in my co-pending application. It is believed these objects are desirable under many conditions for which valves of this character can be used.

In the accompanying drawing:

Figure 1 is a transverse sectional view, showing two pressure chambers in the walls of the valve housing and on either side of the plug, the plug being shown in elevation and in closed position.

Figure 2 is a longitudinal section of the valve along the line 2—2 in Figure 1.

Figure 3 is a transverse sectional view of another embodiment of the invention wherein one pressure chamber is in the wall of the valve housing and the other is in the stem, the plug being in open position and in part section and part elevation.

Figure 4 is an elevation of the plug showing the opposite side from that shown in Figure 3.

The numeral 1 denotes a valve housing with through ports 2 and 3 adapted to cooperate with a flow line not shown. 4 denotes a chamber in the housing adapted to receive the tapered plug 5 which is rotatable therein. The chamber in the housing has seats 6 cooperative with seat 7 on the surface of the plug 5.

The plug has a through port 8 adapted to cooperate with the through ports 2 and 3 of the housing. The housing has end walls at the top and bottom of the chamber 4, the end wall 9 at the small end of the chamber being preferably integral with the housing, the end wall at the top being a removable bonnet 10 fastened to the body in a conventional manner and with conventional gaskets or packing to make a fluid tight jointure therewith. Between the plug and the end walls are the spaces 12 and 11 respectively at the top and bottom of the plug, these spaces being adapted to receive lubricating grease and to permit limited axial movement of the plug. At the large end of the plug is the stem 13 preferably integral with the plug. The stem passes through an opening in the bonnet 10 which has a ground surface 14 adapted to cooperate with a ground portion 15 on the stem to make a fluid tight seal when grease is forced between the seating surfaces from the space 12. At the top of the stem is the squared portion 16 adapted to receive a wrench for turning the plug.

In the wall of the housing is the pressure lubricating chamber 17 with screw threads 18 cooperative with screw threads 19 on the pressure piston 20. The piston 20 has a stem 21 with a squared portion 22 adapted to receive a wrench to turn the screw piston. At the lower end of the chamber 17 is the passage 23 for conducting grease to the channel 24 which is cut into the face of the plug below one entrance to the through port 8 and is adapted to cooperate with the passage 23. From each end of the channel 24 are channels 25 extending upward to the top of the plug on either side of the same entrance to the port 8.

By the above means it will be observed that communication is had between the pressure chamber 17 and the space 12 at the top of the plug and that when the pressure piston 20 is screwed down, grease in the pressure chamber is forced out of the chamber 17 through the passage 23 and channels 24 and 25 thus greasing the surface of the plug around the entrance to the port 8 and at the same time applying pressure to the space 12 thus filling it with grease also forcing grease between the seating surfaces on the stem and exerting a downward pressure on the plug 5 to urge it against its seat. But when the piston 20 is screwed up, the grease can flow back from space 12 into the chamber 17.

In the preferred form of my invention shown in Figures 1 and 2, I have a like pressure chamber 26 in the walls of the housing preferably on the opposite side of the housing. The chamber 26 has like members, 27 being the threads in the chamber cooperative with threads 28 on the pressure piston 29 which has a stem 30 with a squared portion 31 adapted to receive a wrench. From the bottom of the pressure chamber 26 and extending upward to a point between the top of the port 8 and the top of the plug 5, is the passage 32. Cut into the face of the plug 5 is the channel 33 extending across the top of the entrance to the port 8 on the opposite side of the plug to the port 8 on the opposite side of the plug to the channel 24. The channel 33 is midway between the top of the plug and the top of the port 8 and is adapted to cooperate with the passage 32 when the plug is turned so as to aline them. On either side of the entrance to the port 8, are the channels 34 which extend downward to the space 11.

It will thus be observed that when the pressure piston 29 is screwed down, that grease is forced through the passage 32 and the channels 33 and 34 into the space 11 at the small end of the plug thus exerting upward pressure against it to unseat it and at the same time to lubricate the seating surfaces of the plug. When the pressure piston 29 is screwed up, the grease can flow back from the space 11 into the chamber 26.

In Figure 3, I show an embodiment differing from Figures 1 and 2 in that one of the pressure means is located in the stem. In Figure 3, the stem 13 has the pressure chamber 35 with threads 36 cooperative with threads 37 on the pressure piston 38 which has the stem 39 with a squared portion 40 adapted to receive a wrench. From the bottom of the pressure chamber 35 is the passage 41 through the plug and communicating with the channel 42 in the side wall of the plug chamber. Channel 42 communicates with the channels 43 in the face of the plug when the plug is positioned to aline them. Channels 43 extend downward to the space 11.

Having described the parts to my invention, it will be observed that I provide separate pressure means one adapted to force lubricating grease under the plug to lift it and the other to force lubricating grease against the top of the plug to seat it. At the same time I provide channels for distributing grease between the seating surfaces of the stem and the bonnet so as to seal them against leakage and to ease the turning of the plug. In operation, when I wish to lift the plug, to ease its turning, I screw up on the piston 20 thus providing a space under it in the chamber 17 into which the grease stored in the space 12 can be forced. I then screw down on the piston 29 or 38 which forces grease into the space 11 to lift the plug at the same time forcing grease from space 12 into the pressure chamber 17.

In seating the plug, I follow the reverse procedure. Ordinarily, I adjust the position of the plug by means of the two pistons so that it will not leak but still will turn easily and leave the plug in that position for as long as it operates satisfactorily. If I wish to grease the plug thoroughly, I alternately seat and unseat the plug thus forcing grease into all parts of the seating chamber.

When I wish to put new lubricants into the pressure chambers, I rotate the plug more than a quarter turn which throws the passages 23, 32, and 41 out of alinement with their respective channels on the plug with which they normally cooperate. In this position the pressure chambers are cut off from communication with the line pressure so that the pistons can be removed and grease inserted in the pressure chambers without interference from line pressures.

While the two embodiments of my invention here disclosed are my preferred forms, it is to be understood that my invention is not limited to any particular form or construction but I may use other embodiments adapted to carry out the same principles.

What I desire to claim is:

1. In a rotary valve, a housing fluid tightly enclosing a tapered plug rotatable therein, cooperative seats in the housing and on the plug, means for rotating the plug, said valve having spaces between each end of the plug and the cooperative end wall of the housing, separate fluid pressure means each comprising a chamber with a piston screw threadedly engaging the walls of the chamber, a stem for turning the piston, a port near the bottom of each chamber cooperative with grease passages in the plug one set of passages connecting one port with the space at the top of the plug the other passage connecting the other port with the space at the bottom of the plug, the ports and passages being thrown out of cooperative alinement when the plug is turned beyond its normal operative range.

2. A valve of the character described including a housing provided with a valve core chamber and having separate lubricant pressure chambers and passageways leading from said pressure chambers, a valve core rotatably and reciprocably mounted in the valve core chamber and having independent ports communicating respectively with the passageways and with the valve core chamber at the respective ends of the valve core when the valve core is in one position, and adapted to be out of communication when the valve core is rotated to another position in the valve core chamber, pistons in said pressure chambers, and means for selectively moving said pistons in opposite directions to cause lubricant to move from one pressure chamber to act on one end of the valve core and from the valve core chamber at the opposite end of the valve core to the other pressure chamber.

3. In a rotary valve, a housing fluid tightly enclosing a tapered plug rotatable therein, cooperative seats in the housing and on the plug, said valve having spaces between each end of the plug and the cooperative end wall of the housing, means for rotating the plug, separate fluid pressure generating means each comprising a chamber, the chambers each having a port near the bottom thereof cooperative with grease passages in the plug, one set of passages connecting one port with the space at the top of the plug, the other passage connecting the other port with the space at the bottom of the plug, the ports and passages being thrown out of cooperative alignment when the plug is turned beyond its normal operative range.

4. A valve of the character described including a housing provided with a valve core chamber and having separate lubricant pressure chambers and passageways leading from said pressure chambers, a valve core rotatably and reciprocably mounted in the valve core chamber and having independent ports communicating respectively with the passageways and with the valve core chamber at the respective ends of the valve core when the valve core is in one position, and adapted to be out of communication when the valve core is rotated to another position in the valve core chamber, fluid pressure generating means in said pressure chambers, and means for selectively moving said fluid pressure generating means in opposite directions to cause lubricant to move from one pressure chamber to act on one end of the valve core and from the valve core chamber at the opposite end of the valve core to the other pressure chamber.

5. In a rotary valve of the character described, a valve housing having through ports and having opposed end portions, a plug mounted in the housing between said end portions having a through port alignable with the housing ports, the plug being of less length than the distance between the end portions of the housing to provide spaces between upper and lower ends of the plug and the end portions of the housing, the housing and plug having passageways partly in the valve housing and partly in the plug, fluid pressure generating and lubricating means in the housing having communication with said passageways, said passageways respectively leading from the fluid pressure generating means to the ends of the plug wherethrough lubricant is passed when the pressure means is actuated for lubricating the plug and for alternately moving the plug axially between the end portions of the valve housing, and means for moving the plug to disalign the passageways for removal and recharging of the fluid pressure generating and lubricating means, without back flow of fluid from the spaces at the respective ends of the plug through the passageways.

6. In a rotary valve of the character described, a valve housing having through ports and having opposed end portions, a plug mounted in the housing between said end portions having a through port alignable with the housing ports, the plug being of less length than the distance between the end portions of the housing to provide spaces between the upper and lower ends of the plug and the end portions of the housing, the housing and plug having passageways partly in the plug and partly in the valve housing, fluid pressure generating and lubricating means in the housing and on the plug having communication with said passageways, said passageways respectively leading from the fluid pressure generating means to the ends of the plug wherethrough lubricant is passed when the pressure means is actuated for lubricating the plug and for alternately moving the plug axially between the end portions of the valve housing, and means for moving the plug to disalign the passageways for removal and recharging of the fluid pressure generating and lubricating means without back flow from the spaces at the respective ends of the plug through the passageways.

7. In a rotary valve of the character described, a valve housing having through ports and having end portions, a plug mounted in the housing between said end portions having a through port alignable with the housing ports, the plug being of less length than the distance between the end portions of the housing to provide spaces between upper and lower ends of the plug and the end portions of the housing, the valve housing and plug having passageways partly in the valve housing and partly in the plug, fluid pressure generating and lubricating means in the housing, said passageways respectively leading from the fluid pressure generating means to the ends of the plug wherethrough lubricant is passed when the pressure means is actuated for lubricating the plug and for alternately moving the plug axially between the end portions of the valve housing, and means for aligning and disaligning the passageways.

8. In a rotary valve of the character described, a valve housing having through ports and having end portions, a plug seated in the housing between said end portions having a through port alignable with the housing ports, the plug being of less length than the distance between the end portions of the housing to provide spaces between the upper and lower ends of the plug and the end portions of the housing, the housing and plug having passageways partly in the plug and partly in the valve housing, fluid pressure generating and lubricating means in the housing and on the plug communicating with said passageways, said passageways respectively leading from the fluid pressure generating means to the ends of the plug wherethrough lubricant is passed when the pressure means is actuated for lubricating the plug and for alternately moving the plug axially between the end portions of the valve housing, and means for selectively aligning and disaligning the passageways.

9. In a rotary valve of the character described, a valve housing having opposed end portions, a plug mounted in the housing having through ports alignable with the housing ports, the plug being of less length than the distance between the end portions of the housing to provide spaces between upper and lower ends of the plug and the end portions of the housing, the housing and plug having passageways partly in the valve housing and partly in the plug, fluid pressure generating and lubricating means in the housing having communication with said passageways, said passageways leading from the fluid pressure generating means to the ends of the plug wherethrough lubricant is passed when the pressure means is actuated for lubricating the plug and for moving the plug axially in the valve housing, and means for moving the plug to disalign the passageways for removal and recharging of the fluid pressure generating and lubricating means, without back flow of fluid from the spaces at the respective ends of the plug through the passageways.

10. In a rotary valve of the character described, a valve housing having through ports and end portions, a plug seated in the housing having through ports alignable with the housing ports, the plug being of less length than the distance between the end portions of the housing to provide spaces between the upper and lower ends of the plug and the end portions of the housing, the housing and plug having passageways partly in the plug and partly in the valve housing, fluid pressure generating and lubricating means on the plug and in the housing communicating with said passageways, said passageways leading from the fluid pressure generating means to the ends of the plug wherethrough lubricant is passed when the pressure means is actuated for lubricating the plug and for moving the plug axially in the valve housing, and means for selectively aligning and disaligning the passageways.

11. In a rotary valve of the character described, a valve housing having through ports and having opposed end portions, a plug mounted in the housing between said end portions having a through port alignable with the housing ports, the plug being of less length than the distance between the end portions of the housing to provide spaces between upper and lower ends of the plug and the end portions of the housing, the housing and plug having passageways partly in the valve housing and partly in the plug, a plurality of fluid pressure generating and lubricating means in the housing having communication with said passageways, said passageways respectively leading from the fluid pressure generating means to the ends of the plug wherethrough lubricant is passed when the pressure means is actuated for lubricating the plug and for alternately moving the plug axially between the end portions of the valve housing, and means for moving the plug to disalign the passageways for removal and recharging of the fluid pressure generating and lubricating means, without back flow of fluid from the spaces at the respective ends of the plug through the passageways.

12. In a rotary valve of the character described, a valve housing having through ports and having opposed end portions, a plug mounted in the housing between said end portions having a through port alignable with the housing ports, the plug being of less length than the distance between the end portions of the housing to provide spaces between the upper and lower ends of the plug and the end portions of the housing, the housing and plug having passageways partly in the plug and partly in the valve housing, separate fluid pressure generating and lubricating means in the housing and on the plug having communication with said passageways, said passageways respectively leading from the fluid pressure generating means to the ends of the plug wherethrough lubricant is passed when the pressure means is actuated for lubricating the plug and for alternately moving the plug axially between the end portions of the valve housing, and means for moving the plug to disalign the passageways for removal and recharging of the fluid pressure generating and lubricating means without back flow from the spaces at the respective ends of the plug through the passageways.

13. In a rotary valve of the character described, a valve housing having through ports and having end portions, a plug mounted in the housing between said end portions having a through port alignable with the housing ports, the plug being of less length than the distance between the end portions of the housing to provide spaces between upper and lower ends of the plug and the end portions of the housing, the valve housing and plug having passageways partly in the valve housing and partly in the plug, a plurality of fluid pressure generating and lubricating means in the housing, said passageways respectively leading from the fluid pressure generating means to the ends of the plug wherethrough lubricant is passed when the pressure means is actuated for lubricating the plug and for alternately moving the plug axially between the end portions of the valve housing, and means for aligning and disaligning the passageways.

14. In a rotary valve of the character described, a valve housing having through ports and having end portions, a plug seated in the housing between said end portions having a through port alignable with the housing ports, the plug being of less length than the distance between the end portions of the housing to provide spaces between the upper and lower ends of the plug and the end portions of the housing, the housing and plug having passageways partly in the plug and partly in the valve housing, separate fluid pressure generating and lubricating means in the housing and on the plug communicating with said passageways, said passageways respectively leading from the fluid pressure generating means to the ends of the plug wherethrough lubricant is passed when the pressure means is actuated for lubricating the plug and for alternately moving the plug axially between the end portions of the valve housing, and means for selectively aligning and disaligning the passageways.

15. In a rotary valve of the character described, a valve housing having opposed end portions, a plug mounted in the housing having through ports alignable with the housing ports, the plug being of less length than the distance between the end portions of the housing to provide spaces between upper and lower ends of the plug and the end portions of the housing, the housing and plug having passageways partly in the valve housing and partly in the plug, a plurality of fluid pressure generating and lubricating means in the housing having communication with said passageways, said passageways leading from the fluid pressure generating means to the ends of the plug wherethrough lubricant is passed when the pressure means is actuated for lubricating the plug and for moving the plug axially in the valve housing, and means for moving the plug to disalign the passageways for removal and recharging of the fluid pressure generating and lubricating means, without back flow of fluid from the spaces at the respective ends of the plug through the passageways.

16. In a rotary valve of the character described, a valve housing having through ports and end portions, a plug seated in the housing having through ports alignable with the housing ports, the plug being of less length than the distance between the end portions of the housing to provide spaces between the upper and lower ends of the plug and the end portions of the housing, the housing and plug having passageways partly in the plug and partly in the valve housing, separate fluid pressure generating and lubricating means on the plug and in the housing communicating with said passageways, said passageways leading from the fluid pressure generating means to the ends of the plug wherethrough lubricant is passed when the pressure means is actuated for lubricating the plug and for moving the plug axially in the valve housing, and means for selectively aligning and disaligning the passageways.

JAMES O. LEWIS.